United States Patent [19]

Gur et al.

[11] Patent Number: 5,872,859
[45] Date of Patent: Feb. 16, 1999

[54] TRAINING/OPTIMIZATION OF COMPUTER AIDED DETECTION SCHEMES BASED ON MEASURES OF OVERALL IMAGE QUALITY

[75] Inventors: David Gur; Bin Zheng, both of Pittsburgh, Pa.

[73] Assignee: University of Pittsburgh, Pittsburgh, Pa.

[21] Appl. No.: 556,814

[22] Filed: Nov. 2, 1995

[51] Int. Cl.[6] .................................................. G06K 9/00
[52] U.S. Cl. .......................................... 382/128; 382/224
[58] Field of Search .................................... 382/128, 129, 382/130, 131, 132, 133, 220, 224; 364/413.13

[56] References Cited

U.S. PATENT DOCUMENTS

| | | | |
|---|---|---|---|
| 4,515,165 | 5/1985 | Carroll | 600/475 |
| 4,839,807 | 6/1989 | Doi et al. | 382/128 |
| 4,851,984 | 7/1989 | Doi et al. | 382/108 |
| 4,907,156 | 3/1990 | Doi et al. | 382/130 |
| 5,133,020 | 7/1992 | Giger et al. | 382/130 |
| 5,212,637 | 5/1993 | Saxena | 600/407 |
| 5,235,510 | 8/1993 | Yamada et al. | 364/413.02 |
| 5,289,374 | 2/1994 | Doi et al. | 600/407 |
| 5,319,549 | 6/1994 | Katsuragawa et al. | 382/108 |
| 5,343,390 | 8/1994 | Doi et al. | 382/132 |
| 5,369,572 | 11/1994 | Haraki et al. | 382/132 |
| 5,579,402 | 11/1996 | Hayen | 382/132 |
| 5,598,481 | 1/1997 | Nishikawa et al. | 382/130 |
| 5,627,907 | 5/1997 | Gur et al. | 382/132 |

OTHER PUBLICATIONS

Robert M. Nishikawa, et al, Effect of case selection on the performance of computer–aided detection schemes, Med. Phys. 21(2), Feb. 1994.

J. Suckling, et al, Segmentation of mammograms using multiple linked self–organizing neural networks, Med. Phys. 22(2), Feb. 1995.

Ji Chen, PhD, et al, Fractal Analysis of Trabecular Patterns in Projection Radiographs an Assessment, Investigative Radiology vol. 29, No. 6, 624–629—1994.

Karssemeijer, et al, Spatial Resolution in Digital Mammography, Investigative Radiology, May 1993, vol. 28, pp. 413–419.

Nishikawa, et al, Effect of Case Selection on the Performance of Computer–aided Detection Schemes, Medical Physics, Feb., 1994, vol. 21, No. 2, pp. 265–269.

Nishikawa, et al, Computer–aided Detection and Diagnosis of Masses and Clustered Microcalcifications From Digital Mammograms, SPIE, vol. 1905, pp. 422–432.

Wu, et al, Computerized Detection of Clustered Microcalcifications in Digital Mammograms: Applications of Artificial Neural Networks, Med. Phys. May/Jun. 1992, vol. 19(3), pp. 555–560.

(List continued on next page.)

Primary Examiner—Amelia Ali
Assistant Examiner—Jayanti K. Patel
Attorney, Agent, or Firm—Pillsbury Madison & Sutro LLP

[57] ABSTRACT

A computerized method of detecting regions of interest in a digital image optimizes and adapts a computer aided scheme for detecting regions of interest in images. The optimization is based on global image characteristics. For each image in a database of images having known regions of interest, global image features are measured and an image characteristic index is established based on these global image features. All the images in the database are divided into a number of image groups based on the image characteristic index of each image in the database and the CAD scheme is optimized for each image group. Once the CAD scheme is optimized, to process a digital image, an image characteristics based classification criteria is established for that image, and then global image features of the digitized image are determined. The digitized image is then assigned an image characteristics rating based on the determined global image features, and the image is assigned to an image group based on the image rating. Then regions of interest depicted in the image are determined using a detection scheme adapted for the assigned image group.

13 Claims, 8 Drawing Sheets

OTHER PUBLICATIONS

Zhang, et al, Computerized Detection of Clustered Microcalcifications in Digital Mammograms Using a Shift–Invariant Artificial Neural Network, Med. Phys. Apr. 1994, vol. 21, No. 4, pp. 517–524.

Stafford, et al, Application of Neural Networks to Computer Aided Pathology Detection in Mammography. SPIE 1993, vol. 1896, pp. 341–352.

Nishikawa et al, Computer–aided Detection of Clustered Microcalcifications: An Improved Method for Grouping Detected Signals, Med. Phys. Nov./Dec. 1993, vol 20(6), pp. 1661–1666.

Chan, et al, Digitization Requirements in Mammography: Effects on Computer–aided Detection of Microcalcifications, Med. Phy. Jul. 1994, vol. 21(7), pp. 1203–1210.

Shen, et al, Aplication of Shape Analysis to Mammographic Calcifications, IEEE: Transactions on Medical Imaging Jun. 1994, vol. 13, No. 2, pp. 263–274.

Yin, et al, Comparison of Bilateral–Subtraction and Single–Image Processing Techniques in the Computerized Detection of Mammographic Masses, Investigative Radiology 1993, vol. 28, No. 6, pp. 473–481.

Yin, et al, Computerized Detection of Massess in Digital Mammograms: Investigation of Feature–Analysis Techniques, Journal of Digital Imaging 1994, vol. 7. No. 1, pp. 18–26.

Yin, et al, Computerized Detection of Masses in Digital Mammograms: Analysis of Bilateral Subtraction Images, Med. Phys. Sep./Oct. 1991, vol. 18(5), pp. 955–963.

Lai, et al, On Techniques for Detecting Circumscribed Masses in Mammograms, IEEE Transactions on Medical Imaging Dec. 1989, vol. 8, No. 4, pp. 377–386.

Brzakovic, et al, An Approach to Automated Detection of Tumors in Mammograms, IEE Transactions on Medical Imaging Sep. 1990, vol. 9, No. 3, pp. 233–241.

Lucier, et al, Wavelet Compression and Segmentation of Digital Mammograms, Journal of Digital Imaging, Feb. 1994, vol. 7, No. 1, pp. 27–28.

Carl J. Vyborny and Maryellen L. Giger, Computer Vision and Artificial Intelligence in Mammography, AJR:162, Mar. 1994, pp. 699–708.

Philip Strax, M.D., Detection of Breast Cancer, Cancer 1990, vol. 66, pp. 1336–1340.

Heang–Ping Chan, Ph.D., Kunio Doi, Ph.D., Carl J. Vyborny, M.D., Ph.D., Kwok–Leung Lam, Ph.D., and Robert A. Schmidt, M.D., Computer–Aided Detection of Microcalcifications in Mammograms Methodology and Preliminary Clinical Study, Invest Radiol 1988, vol. 23, pp. 664–670.

Maryellen L. Giger, Fang–Fang Yin, Kunio Doi, Charles E. Metz, Robert A. Schmidt, Carl J. Vyborny, Investigation of Methods for the Computerized Detection and Analysis of Mammographic Masses, SPIE 1990, vol. 1233, pp. 183–184.

W. Phillip Kegelmeyer, Jr., Computer Detection of Stellate Lesions in Mammograms, SPIE 1992, vol. 1660, pp. 446–454.

D.H. Davies and D.R. Dance, Automatic Computer Detection of Clustered Calcifications in Digital Mammograms, Phys. Med. Biol. 1990, vol. 35, No. 8, pp. 1111–1118.

D.H. Davies and D.R. Dance, The Automatic Computer Detection of Subtle Calcifications in Radiographically Dense Breasts, Phys. Med. Biol. 1992, vol. 37, No. 6, pp. 1385–1390.

Bahaa W. Fam, M.S., Sherry L. Olson, M.S., Peter F. Winter, M.D., Francis J. Scholz, M.D., Algorithm for the Detection of Fine Clustered Calcifications on Film Mammograms, Radiology 1988, vol. 169, pp. 333–337.

Shun Leung Ng and Walter F. Bischof, Automated Detection and Classification of Breast Tumors, Computers and Biomedical Research 1992, vol. 25, pp. 218–237.

Heang–Pin Chan, Kunio Doi, Simranjit Galhotra, Carl J. Vyborny, Heber MacMahon, and Peter M. Jokich, Image Feature Analysis and Computer–Aided Diagnosis in Digital Radiography, I. Automated Detection of Microcalcifications in Mammography, Med. Phys. Jul./Aug. 1987, vol. 14(4), pp. 538–547.

M.L. Giger, P. Lu, Z. Huo, U. Bick, K. Doi, C.J. Vyborny, R.A. Schmidt, W. Zhang, C.E. Metz, D. Wolverton, R.M. Nishikawa, W. Zouras, CAD in Digital Mammography: Computerised Detection and Classification of Masses—Abstract.

R.M. Nishikawa, K. Doi, M.L. Giger, H. Yoshimura, Y. Wa, C.J. Vyborny, R.A. Schmidt, Use of Morphological Filters in the Computerized Detection of Microcalcifications in Digitized Mammograms, Abstract.

Bin Zheng, PhD. Yuan–Hsiang Chang, MS, David Gur. ScD, Computer Detection of Masses in Digitized Mammogram Using Single–Image Segmetation and a Multilayer Topographic Feature Anslysis, University of Pittsburgh, vol. 2, No. 11 Nov. 1995.

Bin Zheng, PhD. Yuan–Hsiang Chang, MS Melinda Staiger, MD. Walter Good, PhD. David Gur. ScD, Computer–Aided Detection of Clustered Microcalcifications in Digitized Mammograms, University of Pittsburgh, PA. vol. 2, No. 8 Aug. 1995.

TRAINING/OPTIMIZATION OF COMPUTER AIDED DETECTION SCHEMES BASED ON MEASURES OF OVERALL IMAGE QUALITY

BACKGROUND OF THE INVENTION

1. Field of the Invention

This invention relates to computer aided detection of abnormal anatomical regions in radiographs, and, more particularly, to optimization of such computer aided image detection schemes based on overall image quality.

2. Background of the Invention

Detection and analysis of target objects in digital images are useful and important tasks. For example, detection and diagnosis of abnormal anatomical regions in radiographs, such as masses and microcalcifications in womens breast radiographs, so-called mammograms, are among the most important and difficult tasks performed by radiologists.

Breast cancer is a leading cause of premature death in women over forty years old. Evidence shows that early detection, diagnosis and treatment of breast cancer significantly improves the chances of survival, reducing breast cancer morbidity and mortality. Many methods for early detection of breast cancer have been studied and tested, among them mammography. To date mammography has proven to be the most cost effective means of providing useful information to diagnosticians regarding abnormal features in the breast and potential risks of developing breast cancer in large populations. The American Cancer Society currently recommends the use of periodic mammography and screening of asymptomatic women over the age of forty with annual examinations after the age of fifty. Mammograms may eventually constitute one of the highest volume X-ray images routinely interpreted by radiologists.

Between thirty and fifty percent of breast carcinomas detected radiographically demonstrate microcalcifications on mammograms, and between sixty and eighty percent of breast carcinomas reveal microcalcifications upon microscopic examination. Therefore, any increase in the detection of microcalcifications by mammography may lead to further improvements in its efficiency in the detection of early breast cancer.

Currently acceptable standards of clinical care are that biopsies are performed on five to ten women for each cancer removed. With this high biopsy rate is the reasonable assurance that most mammographically detectable early carcinomas will be resected. Given the large amount of overlap between the characteristics of benign and malignant lesions which appear in mammograms, computer-aided detection of abnormalities will have a great impact on clinical care.

At present, mammogram readings are performed visually by mammographic experts, that is, physicians and radiologists. Unfortunately, visual reading of mammograms has two major disadvantages. First, it is often possible to miss the breast cancer in its early stages. This is because, unlike many other cancers, there is as yet no clear way to detect premalignant changes in the breast. This results partly from the relative inaccessibility of breast tissue. A second disadvantage of visual reading of mammograms is that these readings are both labor intensive and time consuming. Multiple readings of a single mammogram may be necessary in order to increase the reliability of the diagnosis.

Therefore, it would be advantageous and useful to have computer-assisted or aided detection (CAD) systems to help radiologists and physicians obtain quicker and more precise results when performing visual readings of mammograms. Such CAD systems would aid in cancer detection and improve the efficiency and accuracy of large-scale screening.

Various computer assisted detection systems have been investigated to assist diagnosticians in their diagnosis of breast cancer.

U.S. patent application Ser. No. 08/352,169, filed Dec. 1, 1994, which is hereby incorporated herein by reference, describes a CAD system for finding abnormal regions (masses or microcalcifications) in digital mammograms using topographical extraction techniques. The system described therein finds suspected regions and then uses several top view layers of each suspected region to determine whether or not that region looks like an abnormal region. A rule-based selection of changes in features is used to select and evaluate suspicious regions.

The topographical system is based on stacking several top-view layers of a suspected region and then evaluating whether that region looks like an abnormal region. This approach is similar to generating topographic maps of a surface and deciding, based on those maps, whether a region on the surface is a mountain, based on the rate of change in elevation for all directions.

To date, other research in computerized detection systems for masses and microcalcifications in digital mammograms has largely been based on thresholding methods or neural networks. One other method, described in Doi, U.S. Pat. No. 4,907,156, uses varying threshold levels to detect nodules for enhancement and detection of abnormal anatomic regions in a digital image of a human chest. U.S. Pat. No. 5,289,374 discloses a method and system for analysis of false positive produced by the system of Doi '156 to reduce the false positive found by the latter system.

In another method, Giger et al, U.S. Pat. No. 5,133,020, use a thresholding technique to locate abnormal regions in a digital image of a radiograph, and then, once the regions have been located, uses classification processing to determine whether the detected abnormal region is benign or malignant. Giger's classification is based on the degree of speculation of the identified abnormal regions.

U.S. Pat. No. 5,319,549 uses texture analysis on a number of small regions of interest in order to determine a classification of normal or abnormal of a patient's lungs.

Doi, U.S. Pat. No. 5,343,390, discloses a method and system for automated selection of regions of interest and detection of septal lines in digital chest radiographs. Doi uses a large number of adjacent regions of interest selected corresponding to an area on a digital image of a patient's lungs. The regions of interest each contain a number of square or rectangular pixel arrays and are selected to sequentially fill in the total selected area of the lungs to be analyzed. The regions of interest are analyzed to determine those exhibiting sharp edges, that is, high edge gradients. A percentage of the sharp edge regions of interest are removed from the original sample based on the edge gradient analysis, the majority of which correspond to rib edge containing regions of interest. After removal of the sharp edge regions of interest, texture measurements are taken on the remaining sample in order to compare such data with predetermined for normal and abnormal lungs.

The above methods and systems have various disadvantages and deficiencies, including that they use absolute measurements only, they are not always robust as a function of image quality variations, and either their sensitivity is too low or they tend to result in too many false positives.

Each radiograph is different in its image and physical characteristics, and some are more difficult to read, interpret or computer analyze than others. A difficult or subtle radiograph may be difficult for either a CAD scheme or a radiologist or both to diagnose. A radiologist will typically spend more time and give more attention to reading and interpreting a difficult image than would be applied to an easy image.

On the other hand, unlike radiologists, CAD systems do not distinguish between difficult and easy images prior to their processing of the images. Accordingly, CAD systems apply the same processing to all images, regardless of their global image characteristics or difficulty as determined by the imaging physics (for example, regardless of the ratio of signal to noise in an image) and breast tissue structure.

For example, the CAD systems referred to above all apply the same processing and rules to all images, regardless of the global characteristics of the image.

Measures of object or target characteristics have been addressed, but only in the context of the difficulty of finding already detected objects or of specific target objects in an image. For example, detection difficulty has been addressed in the context of the subtlety (size and contrast) of already detected masses. However, this type of measure of difficulty based on already detected objects or on specific targets assume the prior detection of the objects or targets.

SUMMARY OF THE INVENTION

In one aspect, this invention provides an adaptive method and apparatus for CAD schemes based on measures of global and non-target-specific image characteristics of a database of known images with known true status as regards the presence or absence of abnormalities.

In another aspect, this invention provides a method and apparatus for, in the case of a specific new image, using an adapted CAD scheme based on the image physics characteristics of that image.

The method and apparatus of this invention improves existing CAD schemes by measuring global image characteristics and quality (developing a score or an index of image quality), based on global image features not related to the particular abnormalities in question. This score or index is used to optimize and adapt CAD scheme rules and criteria to optimize CAD performance for a specific image quality index and perhaps a specific abnormality.

The global image characteristic measure of the present invention is determined by the overall image quality (for example, using image noise, exposure, compression condition and the like) and the structure of the object being imaged (for example, dense parenchyma tissue in a human breast), which will effect both detection sensitivity and specificity.

New images to be analyzed by the CAD schemes are assigned an image category based on their image quality and therefore are analyzed with an optimal set of rules for that type of image quality.

It should be appreciated by those skilled in the art that while a medical-based CAD system is shown and described herein, the present invention is not limited to medical-based systems and applications. It will be understood that the present invention encompasses other, medical and non-medical CAD systems.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE PRESENTLY PREFERRED EXEMPLARY EMBODIMENTS

The present invention operates in two distinct phases. The first phase consists of adapting and optimizing a CAD scheme based on global features of known images. The second phase consists of processing new images based on the (optimized) adapted CAD scheme. The adaptive phase can be repeated as new images are added to the set of known images, thereby improving the adaption.

Figure 1:
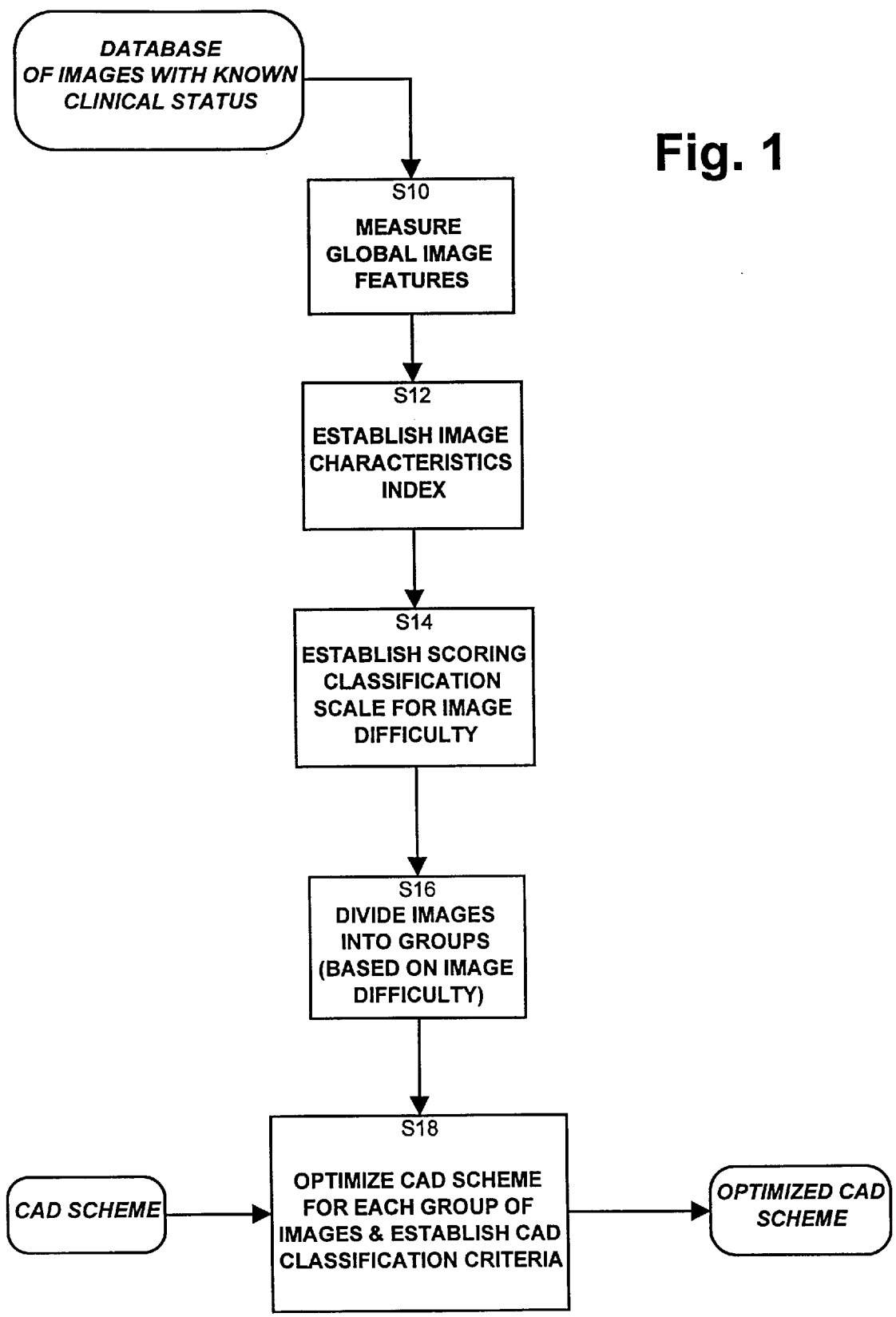
FIG. 1 is a flow chart showing the operation of the adaption and optimization phase of a preferred embodiment of this invention.

The adaptive process of the first phase is described first with reference to FIG. 1. For each image in a database of known images of patients with known clinical status, that is, in a database of images which have been processed and which therefore have known results, global image features and characteristics are computed, for example, in the space and frequency domains (step S10). Based on the image feature distributions of all images in the image database, image global characteristics indices are established for each image (step S12). Next a scoring classification scale for global image characteristics is established (step S14) after which the images are divided into a number of groups based on the scores of image characteristics (step S16). Then, for each group of images, the CAD scheme is optimized independently and image based classification criteria for the detection of depictions of abnormal tissue (for example, solid masses or clusters of microcalcifications) for each group are established (step S18).

For each of the groups of images, the CAD scheme is now optimized (step S18). Since, the results for each image in the image database are already known, the system can determine which aspects or criteria of the CAD scheme are needed to obtain the best results for all images in each group. In this way the CAD scheme is adapted to use different sets of criteria (rules), one set for each of the difficulty groups. In other words, the feature analysis criteria of the CAD are adjusted based on the image characteristic indices of each group.

Since, in the first phase, the CAD scheme is adapted and optimized for each group, it is necessary that the CAD scheme be one which can be so adapted and optimized. The topographical CAD scheme described in U.S. application Ser. No. 08/352,169, which has been fully incorporated herein by reference is such a scheme. In that CAD scheme, a rule-based criteria database is calculated separately and prior to using the system for a particular diagnosis. Rules can be added to the database, and rules in the database can be modified as more accurate tests are determined.

The adaptive optimization process (referred to in step S18) for a particular CAD scheme such as the topographical CAD scheme described above, based on a particular training image database, is typically performed as follows, with reference to FIG. 2. Begin with an training image database 22 with known verified radiographs which have previously been analyzed and with a reasonable set of rules in rules database 24. The rules database 24 contains a rule or rules regarding whether or not an image feature indicates that a region under consideration is a true-positive.

In preferred embodiments, the rules describe values that certain variables can assume as well as relationships between variables. In some preferred embodiments, a twenty two component topographic feature vector of variables is used for each image.

The twenty-two components in each feature vector of a preferred embodiment are as follows:
1. The size in the first layer;
2. the size in the second layer;
3. the size in the third layer;
4. the contrast in the first layer;
5. the contrast in the second layer;
6. the contrast in the third layer;
7. the shape factor in the first layer;
8. the shape factor in the second layer;
9. the shape factor in the third layer;
10. the longest axis in the first layer;
11. the longest axis in the second layer;
12. the longest axis in the third layer;
13. the standard deviation of digital values in the first layer;
14. the standard deviation of digital values in the second layer;
15. the standard deviation of digital values in the third layer;
16. the skewness of digital values in the first layer;
17. the skewness of digital values in the second layer;
18. the skewness of digital values in the third layer;
19. the size growth ratio between the first and second layers;
20. the size growth ratio between the second and third layers;
21. the central position shift between the first and second layers; and
22. the central position shift between the second and third layers.

The size in each layer is determined by a count of the number of pixels inside the growth region in the layer. The contrast in each layer (calculated by $C=(I_2-I_1)/(I_2+I_1)$, which is based on the average digital value inside and outside the growth region in this layer. The shape factor of a region in each layer is a measure of the circularity of the growth region in that layer. The standard deviation of a region in a layer is computed from the second moment of digital value distribution inside the region. The skewness in a layer is computed from the third moment of the digital value distribution inside the region. The size growth ratio between two layers $L_1$ and $L_2$ is calculated by dividing the size of layer $L_2$ by the size of layer $L_1$. The central position shift between two layers is the difference between the region's center in the two layers.

As an example, the starting set of rules in the rules database 24 relate to:
1. The relationship between the contrast value of the third growth layer and the standard deviation of digital values in the third growth layer.
2. The relationship between the size in the second growth layer and the skewness of the digital values in the second growth layer.
3. The relationship between the shape factor in the third growth layer and the skewness of digital values in the third growth layer.
4. The relationship between the contrast value in the first growth layer and the standard deviation of the first growth layer.
5. The relationship between the size growth ratio between the second and the third layers and the central position shift between the second and the third layers.
6. The relationship between the shape factor in the first growth layer and the central position shift between the first and the second growth layers.
7. The relationship between the size growth ratio between the first and the second growth layers and the central position shift between the first and second growth layers.
8. The relationship between the shape factor in the third growth layer and the longest axis in the third growth layer.
9. The relationship between the shape factor in the second growth layer and the central position shift between the second and the third growth layers.
10. The relationship between the contrast value in the second growth layer and the standard deviation of digital values in the second growth layer.
11. The relationship between the contrast value in the third growth layer and the size growth ratio between the second and the third growth layers.
12. The relationship between the shape factor in the second growth layer and the shape factor in the third growth layer.

Figure 2:
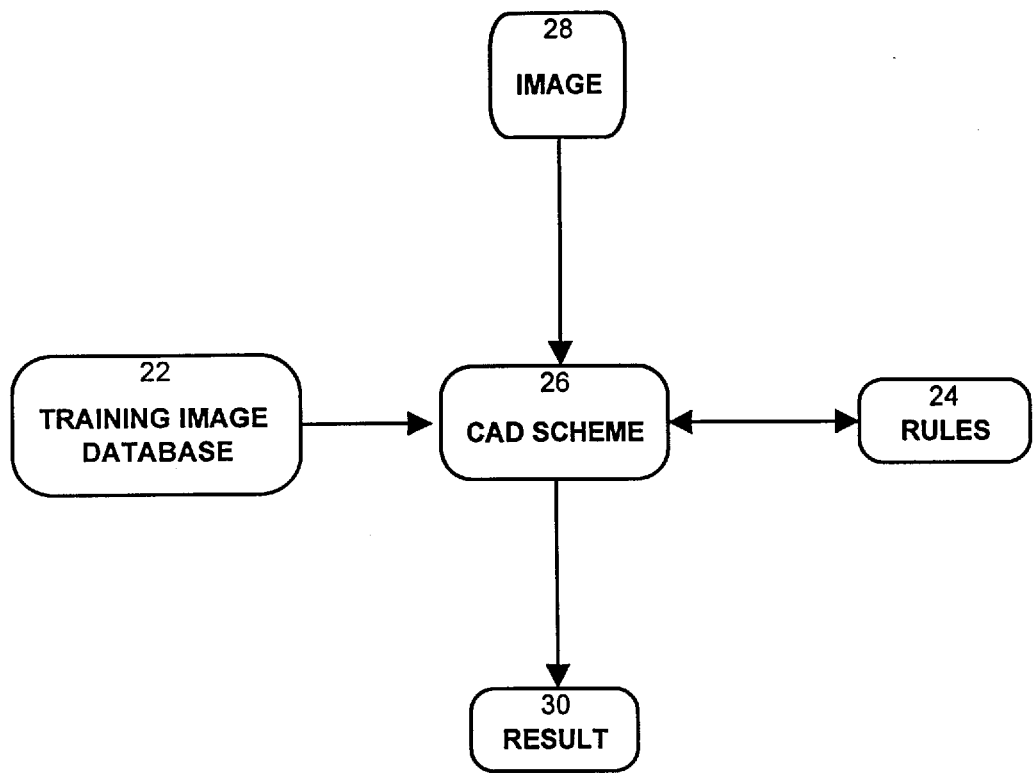
FIG. 2 shows a particular adaptable and optimizable CAD scheme.
Figure 3:
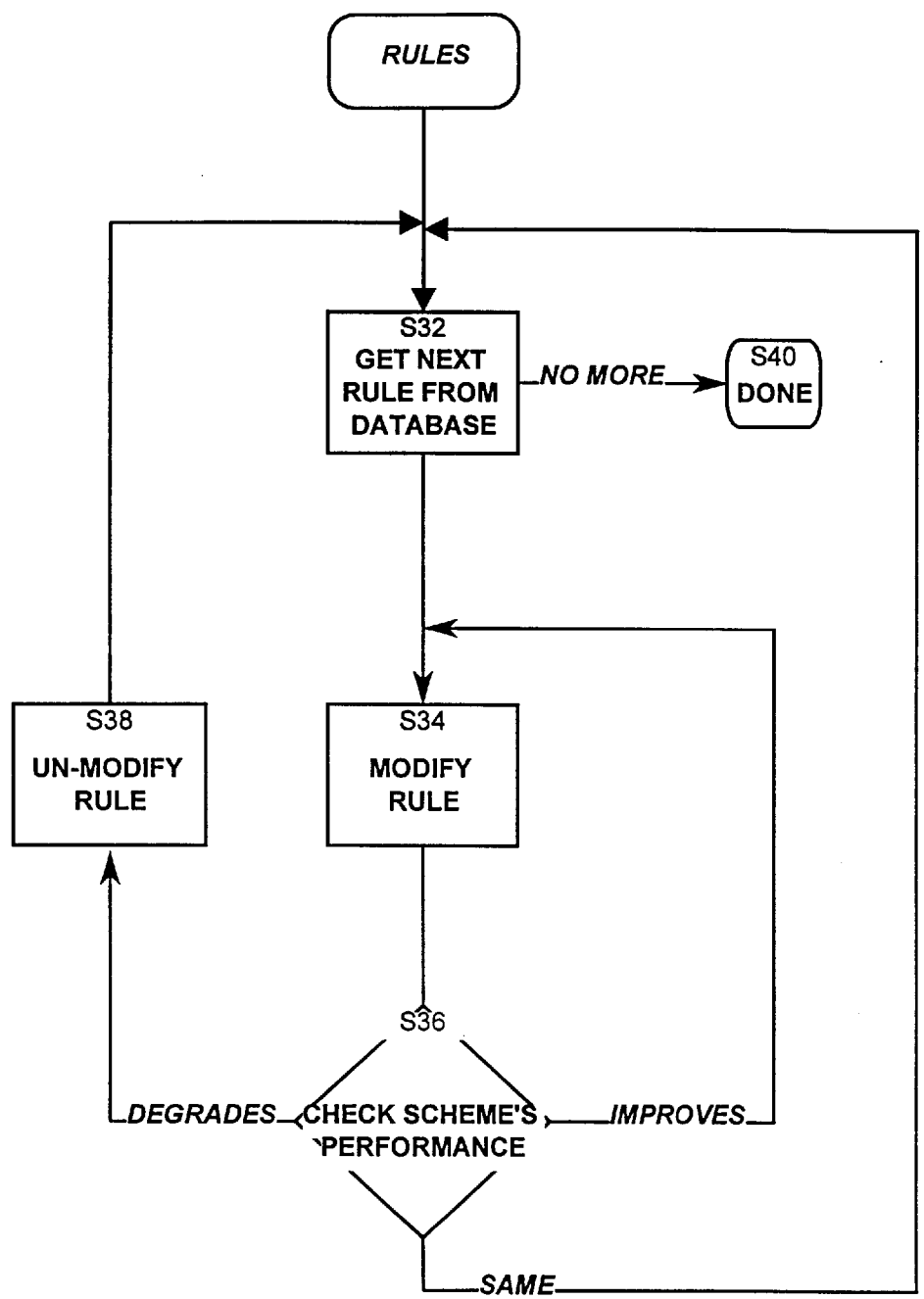
FIG. 3 is a flow chart showing the operation of adaption and optimization of a CAD scheme as in FIG. 2 according to a preferred embodiment of this invention.

With reference to FIGS. 2 and 3, the iterative adaptive and optimization process for CAD scheme 26 is described. For each image in the image database 22, for each rule in the rules database 24 (step S32), modify the rule (modify, by small increments, the values of variables associated with the rule) (step S34) and determine whether or not the CAD scheme's performance (sensitivity and specificity) improves (step S36). Effectively, optimize the rules and then check to see whether or not the performance of the CAD scheme 26 is improved, remains the same, or deteriorates. If the CAD scheme's performance deteriorates, leave the current rule as it was before the change that caused the deterioration (un-modify the rule, step S38), and continue with the next rule (step S32). If the performance stays the same, leave the current rule as it is and go on to the next rule (step S32). If the performance improves, modify the rule further (step S34) and re-evaluate its effect on performance (step S36). This process is repeated until all the rules in the rules database 24 have been processed and no changes in any rules cause any further changes in performance of the CAD scheme 26, at which time processing is done (step S40). At this point the CAD scheme 26 is adapted and optimized for the particular image database 22. Then, in order to process a new image 28, the CAD scheme 26 applies the appropriate optimized rules in rule database 24 to the image 28 to obtain results 30.

Figure 4:
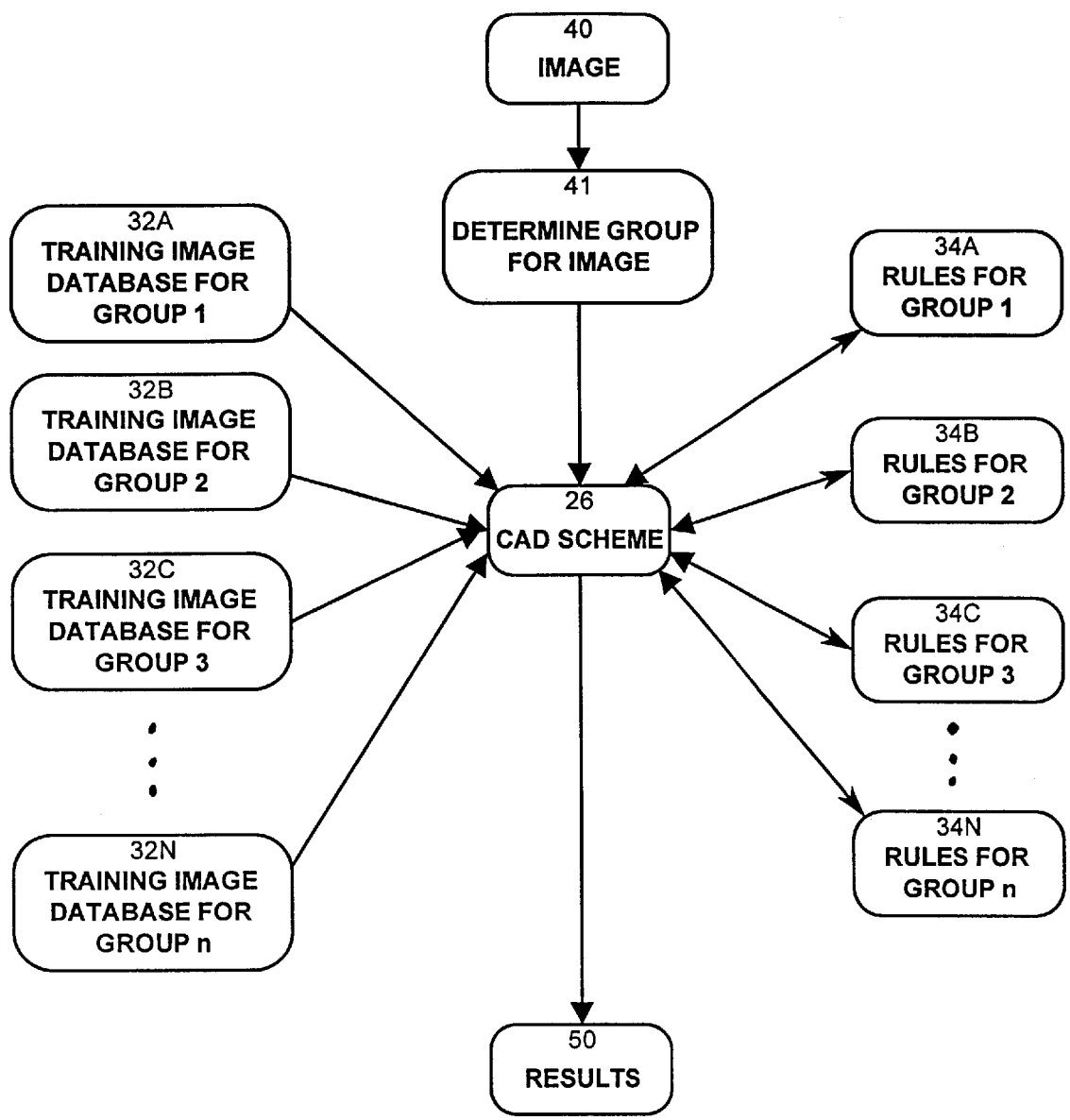
FIG. 4 illustrates an embodiment of the CAD scheme of this invention.

Referring again to FIG. 1, in step S18, the CAD scheme is optimized by the method shown in FIG. 3 for each of the groups of images into which the image database has been divided. Effectively, with reference to FIG. 4, each group of images defines a separate training database 32A, 32B, 32C, . . . 32N. The CAD scheme 26 is adapted and optimized separately for each of these N training databases 32A, . . . 32N to produce N sets of rules 34A, . . . 34N, one set corresponding to each training database. This adaption and optimization takes place for each group training database 32A, ... 32N as described for a particular database with reference to FIG. 3. That is, for each group's training database 32A, ... 32N, a reasonable set of starting rules is chosen and then the rules are iteratively modified until the performance of the CAD scheme for that particular training database is maximized.

Once the image database has been processed, the CAD scheme adapted and optimized criteria established, as described above, new images can be processed by the system (in the second phase) for diagnostic purposes.

Figure 5:
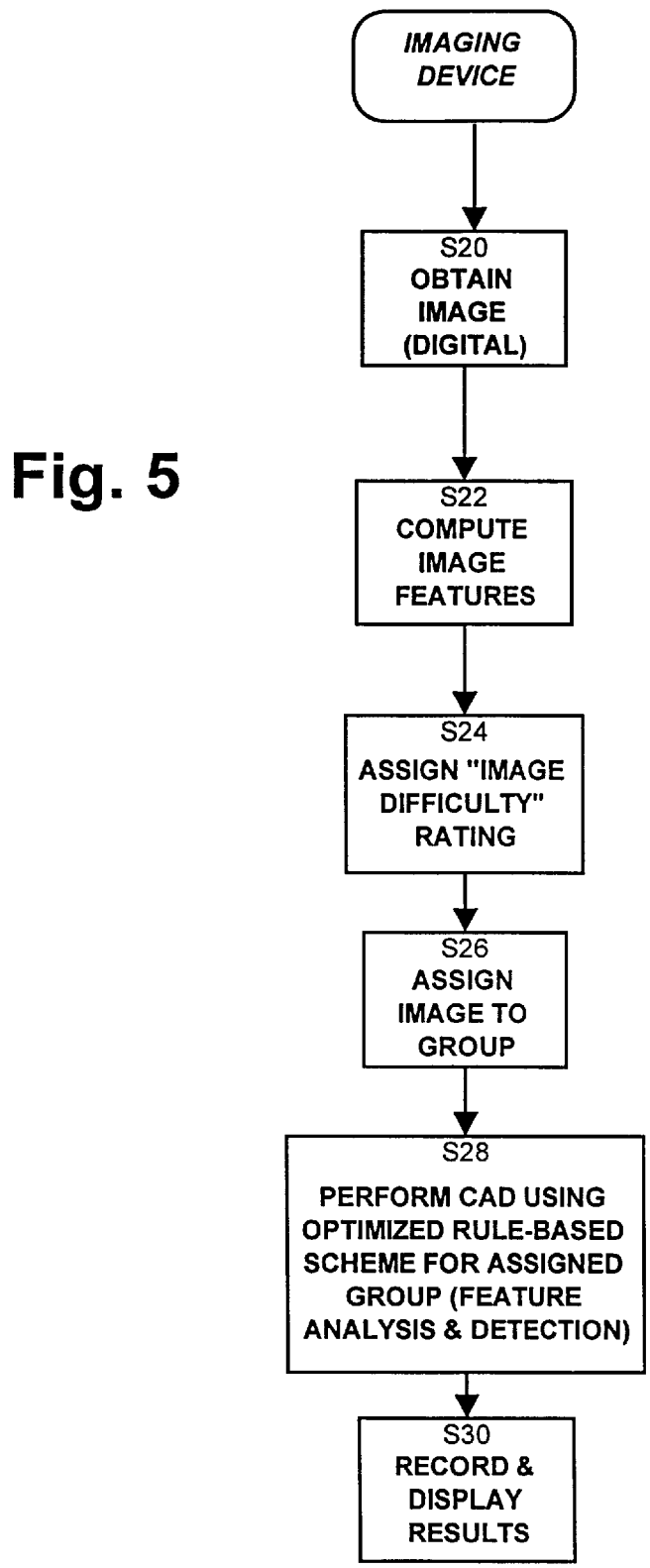
FIGS. 5–7 are flow charts showing details of operation of the invention.
Figure 8:
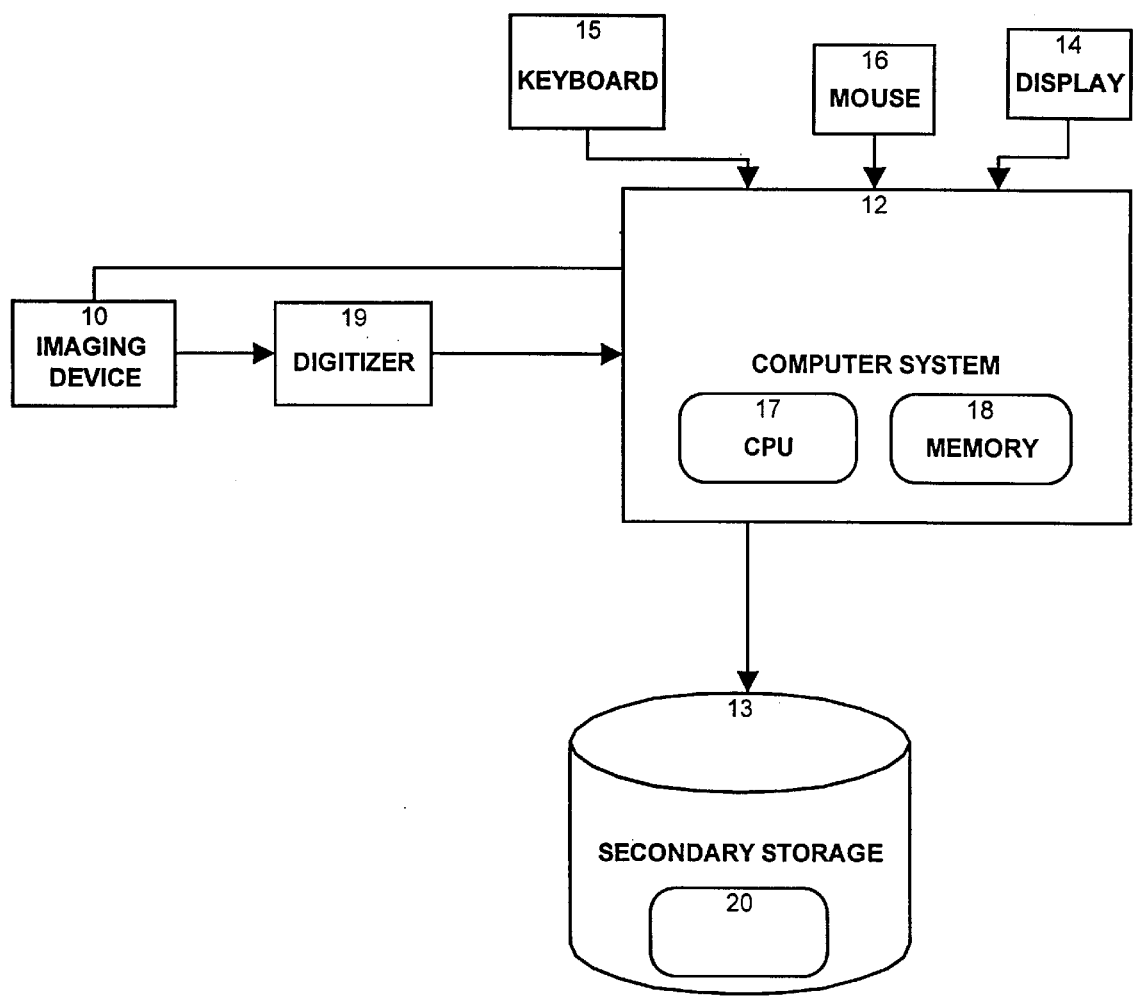
FIG. 8 is a block diagram illustrating an embodiment of this invention.

With reference to FIG. 5, first, a digital image 40 is obtained (step S20) in a typical manner using a device such as image device 10 (shown in FIG. 8). The group to which this image belongs must be determined so that it can be processed using the appropriate rules. Accordingly, next the image features for the new image are computed (step S22) using the same approach described above for steps S10 (S100–S104). Having computed the image features of the new image, the image is assigned an image characteristics score or rating (step S24) and the features determined in step S22. Using the image characteristics rating, the image is assigned to an image group (step S26). Then the image 40 is processed using the particular optimized rule-based CAD scheme adapted for the image group for this image (step S28) (that is, the image is determined to belong to a particular group, and one set of rules from the rules databases 34A, ... 34N are applied by the CAD scheme 26 to the image 40), and the results 50 are recorded and displayed (step S30).

In other words, in order to process a new image, a rule-based scheme which has been optimized so that the type of an image, in terms of global image characteristics, is used rather than a standard fixed rule-based scheme.

A digital image 40 comprises pixel digital values which measure the grey level of the image in the space domain. In a preferred embodiment, each of these values uses twelve (12) bits, giving pixel digital values in the range 0 to 4,096 (0 to $2^{12}-1$). From the space domain, frequency domain values can be determined in a known manner using, for example, a standard fast Fourier transform (FFT) algorithm.

Figure 6:
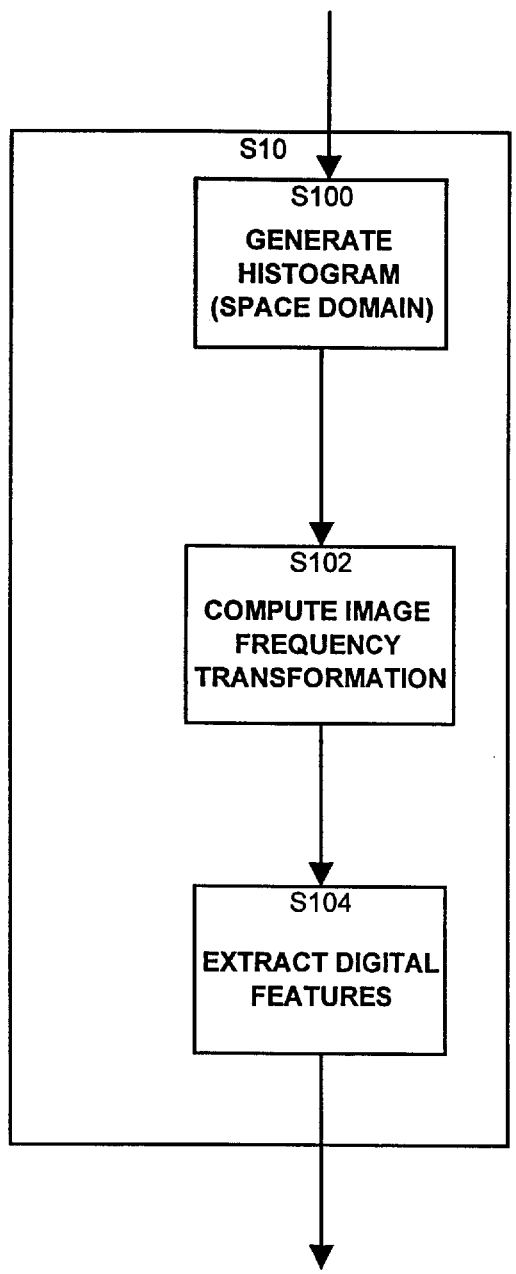

With reference to FIG. 6, in some preferred embodiments, the measurement of image features (step S10 in FIG. 1) comprises measuring image features in the space and frequency domains. First generate a histogram in the space domain (step S100). That is, generate a histogram of the pixel digital values. In the frequency domain (obtained using a Fourier transform), extract various other quantitative feature values (step S102). Then, from the histogram, extract various digital features (step S104). The global features may also be measured in only one of the space and frequency domains or in some other way.

In some preferred embodiments, the following five (5) digital features are extracted from the space domain histogram (in step S100). Note that the space domain histogram used here has been modified from the original histogram of a digitized mammogram. In particular, two modifications have been made. In the first modification, the portion of the histogram related to the background digital values outside the breast area is removed from the histogram. In the second modification, a threshold value which equals 1/e of the peak point value of the histogram (e=2.7183) is used to remove the small fluctuations in the lower portion of the histogram. Thus, in the final space domain histogram described here, only the values related to the breast area and above the threshold remain:

$S_1$: the ratio between the peak value in the histogram and the area of the breast;

$S_2$: the difference between the peak point value and the average value of the histogram;

$S_3$: the standard deviation of the histogram distribution;

$S_4$: the skewness of the histogram distribution; and $S_5$: the number of local maxima in the histogram.

In the frequency domain, three (3) quantitative feature values are extracted (in Step S104):

$S_6$ and $S_7$: the ratios between the number of pixels after thresholding in the bandpass filtered images and the breast area with a higher and a lower frequency bandpass, respectively; and $S_8$: the fractal dimension measurement in the central portion of the breast area.

Thus, for each image in the image database, eight image features $S_1$ to $S_8$ are measured (in step S10 (S100–S104)).

Figure 7:
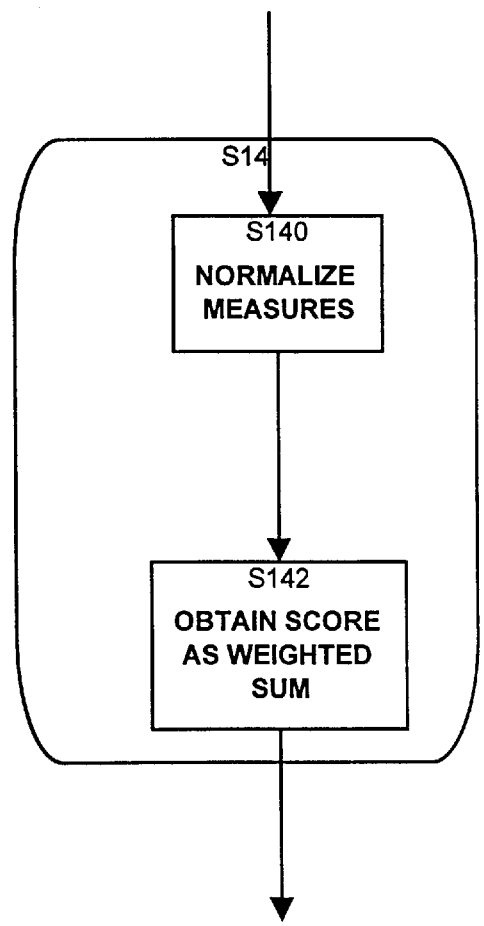

Having measured the image features for an image (step S10), a scoring reference for image difficulty is established (step S14). With reference to FIG. 7, first, the measures are normalized (step S140) and then a score is obtained as a weighted sum of the measures (step S142).

Preferably, each quantitative measurement ($S_1$–$S_8$) is normalized into a range of 1 to 10 based on the measurements of the training image data set (Step S140). In a preferred embodiment, the weights for the five measurements extracted in the space domain ($S_1$–$S_5$) and the fractal dimension ($S_8$) are one (1), while the weights for the two bandpass measurements ($S_6$ and $S_7$) are two (2). Thus, the difficulty score for each image is obtained (in step S142) using the following equation (1):

$$\text{Score} = \left( \sum_{i=1}^{5} S_i + 2 \times \sum_{i=6}^{7} S_i + S_8 \right) \div 10 \quad (1)$$

In a preferred embodiment, the images are then divided into three groups (in step S16, FIG. 1) based on their difficulty scores. The three groups are as follows:

Group I: $1 \leq \text{Score} < 3.5$

Group II: $3.5 \leq \text{Score} < 5.5$

Group III: $5.5 \leq \text{Score} \leq 10$.

Other boundary criteria and more or fewer groups can be used. The boundary criteria and weighting factors may be non-linear functions.

Implementation

The present invention has been implemented using a hardware system as shown in FIG. 8, wherein an imaging device 10 such as an X-ray mammography device is connected directly or indirectly to a computer system 12 in order to provide the computer system 12 with the image data. The computer system 12 has a central processor (CPU) 17 and a random access memory (RAM) 18. Associated with computer system 12 is secondary storage 13, such as, for example, optical disks, hard disks, etc., for storing programs and image data obtained from imaging device 10. Connected to computer system 12 are various input and control devices, such as keyboard 15 and mouse 16. Display 14 is connected to computer system 2 to display commands, images, and other information produced by the computer system. Various enhanced co-processor chips may be installed into computer system 12 to work in conjunction with the CPU 17 in order to increase the processing power of the computer. An image digitizer 19 is connected either directly or indirectly to computer system 12 in order to provide it with digital image data of the images produced by the imaging device 10.

Secondary storage 13 contains an image database 20 containing digital images that have already been processed by the system. In other words, the images in image database 20 have known results and known clinical status such as the presence or absence of the abnormalities in question.

In operation, the imaging device 10 acquires images of the appropriate anatomical area or part of a human body. In some embodiments, the imaging device 10 is a radiographic or X-ray imaging device capable of producing X-ray mammograms. The imaging device 10 is capable of producing X-ray mammograms with a resolution of at least 500×500 pixels. These mammograms can be from any view appropriate for detection of abnormalities. Imaging device 10 can generate a direct digital image or provide means to digitize films. Imaging device 10 may have a separate computer system (not shown) to control its operations for producing radiographs.

Computer system 12 is connected directly or indirectly to the imaging device 10 in order to obtain, store, and analyze the images produced by the imaging device 10. If imaging device 10 does not produce digital images, then digitizer 19, capable of digitizing an image produced by imaging device 10 can be used to provide digital images to the computer system 12.

Because of the high resolution required in order to evaluate digital radiographs, typically, storage device 13 is a high capacity storage device, and display 14 is able to display digital radiographic images at a resolution sufficient to enable and assist in their analysis and diagnosis.

In the presently preferred embodiments (at the time this application is being written) a SUN Sparcstation is used as computer system 12. The storage device is either an eight millimeter magnetic tape (for example, 3M eight mm data tape) or an optical disk (for example, LaserMemory DEC-702 rewritable optical disk, available from Pioneer Communications of America, Upper Saddle River, N.J.). The display is a 21 inch Sun color monitor with a screen resolution of 1100×850 pixels. While the computer system 12 may be directly connected to the imaging device 10, it is also possible for the imaging device 10 to be separated from the computer system 12 and for digital images to be transferred between the two systems by means of some intermediate storage device such as a portable disk (not shown).

A LUMISYS Model 100 laser film digitizer is used as digitizer 19. The scanning pixel size of LUMISYS digitizer is selectable in the range 50×50 $\mu m^2$ to 400×400 $\mu m^2$, and the gray level of the digitization is twelve (12) bits. For the embodiments described herein, the size of the laser focal spot and scanning pixel were set to 100×100 $\mu m^2$.

The software of the present invention implemented on computer system 10 can be written in any suitable high level computer language. In the present embodiment, the software is written in a combination of the programming languages C and C++. Further, while aspects of the present invention have been implemented in software running on a computer system as described above, all aspects of the present invention can also be implemented in hardware.

Results

Results from an experiment using the present invention are described. This experiment involved two steps or phases. The first step tested a method of computerized scoring of the image characteristic indices based on a small image data set. The second step was to test the CAD performance by adjusting the topographic feature analysis criteria based on the image characteristic indices.

Sixty (60) images (corresponding to thirty (30) cases) were visually selected from an image data base used for mass detection. These images were then divided into three groups based on subjective visual inspection, each group containing twenty (20) images. Group 1 contained the so-called "easy" images, group 2 included those images with so-called "medium difficulty," and group 3 involved the so-called "difficult" images. From the histogram calculation, five (5) digital feature values were computed from the image data in the spatial domain, $S_1$: the ratio between the peak value in the histogram and the area of the breast;

$S_2$: the difference between the peak value and the average value of the histogram;

$S_3$: the standard deviation of the histogram distribution;

$S_4$: the skewness of the histogram distribution; and $S_5$: the number of local maxima in the histogram.

In the frequency domain, the system extracted three quantitative feature values, for each image:

$S_6$ and $S_7$: the ratios between the number of pixels after thresholding in the bandpass filtered images and the breast area with a higher and a lower frequency bandpass, respectively; and $S_8$: the fractal dimension measurement in the central portion of the breast area.

Next, each quantitative measurement was scaled (normalized) into a range of 1 to 10. A weighted summation was performed to score the result. In this experiment, the weights were one for the data extracted in the space domain ($S_1$–$S_5$) and for the fractal dimension ($S_8$), and the weights were two for two bandpass measurement data ($S_6$ and $S_7$).

The difficulty score for each image was given by equation (1) above. After scoring, the boundary conditions for each image were set (as shown in Tables I and II). Table I shows a comparison between the visual selection and computerized score based classification of image difficulty.

TABLE I

Comparison between the visual and computerized classification of image difficulty

| Compute Scoring ↓ | Visual Grouping → | | | |
|---|---|---|---|---|
| | Images In Group 1 | Images In Group 2 | Images In Group 3 | Total Image |
| 1 ≦ Score < 3.5 | 15 | 2 | | 17 |
| 3.5 ≦ Score < 5.5 | 5 | 15 | 5 | 25 |
| 5.5 ≦ Score ≦ 10 | — | 3 | 15 | 18 |
| Total Images | 20 | 20 | 20 | overlap ≦75% |

Table II shows experimental results of scoring the image difficulty.

TABLE II

| Total Images (60) | GROUP 1 | GROUP 2 | GROUP 3 | TOTAL |
|---|---|---|---|---|
| Images In the Group | 17 | 25 | 18 | 60 |
| Total Suspicious Regions In the Group | 160 (9.4/ image) | 373 (14.9/ image) | 368 (20.4/ image) | 910 (15.02/ image) |
| Total False-Positives In the Group | 3 (0.18/ image) | 17 (0.68/ image) | 26 (1.44/ image) | 46 (0.77/ image) |

The consistency between the objective computerized classification and the visual selection is greater than seventy five percent (75%) (see TABLE I). Then, using our current CAD scheme on mass detection to test these sixty (60) images, the CAD performance was summarized in TABLE II. Similar to other CAD schemes, our own scheme achieves better performance on "easy" images (low false-positive detection rate) than on "difficult" images.

Next, the scoring method was applied to a relatively large image database which contains two hundred and thirty five (235) verified mass cases in a total of four hundred and sixty nine (469) digitized mammograms to test adaptive CAD performance on mass detection. The database was divided into two subsets. One subset was used as an optimization (or training) image subset (to determine or optimize the topographic feature classification criteria), and the other subset was used as a testing image subset (to test CAD performance). There are one hundred and eighty (180) images in the optimization subset and two hundred and eighty-nine (289) images in the testing subset (as shown in Tables III and IV). Every image was scored by the CAD program based on its image difficulty index. In the experiment the subroutine of topographic feature criteria was first inactivated in the CAD scheme. The total suspicious mass regions after image segmentation (Gaussian bandpass filtering and thresholding) and the total false-positive masses detected were listed in TABLES III and IV. In the optimization image subset, the CAD scheme detects eighty seven (87) true-positive masses out of ninety (90) verified masses (96.7 percent sensitivity), and also generates a total of four hundred and thirty eight (438) false-positive masses. Then, in order to maintain the same detection sensitivity in this image subset and reduce the number of false-positives, two tests were performed. In the first test, according to the analysis of feature distribution of the image subset, twelve (12) boundary conditions were applied in the topographic feature criteria (see below). These criteria were applied to all images in this subset regardless of their "difficulty" score. The experiment showed that the CAD scheme could correctly classify more than ninety five percent (95%) of false-positives. The overall false-positive detection rate was 0.9 per image.

The following were the topographic image feature criteria for the non-adaptive CAD scheme:

If the relationship between two feature components satisfies one of the following conditions, the feature vector will be considered as negative one and the suspicious region represented by this feature vector will be diagnosed as a negative region by the CAD scheme.

1. The relationship between the contrast value of the third growth layer ($V_3$) and the standard deviation of digital values in the third growth layer ($V_{15}$) is:

$V_3 < 0.21$ if $V_{15} > 0.32$.

2. The relationship between the size in the second growth layer ($V_2$) and the skewness of the digital values in the second growth layer ($V_{17}$) is:

$V_{17} < -2.0$, if $V_2 > 0.15$.

3. The relationship between the shape factor in the third growth layer ($V_9$) and the skewness of digital values in the third growth layer ($V_{18}$) is:

$V_{18} < 15.62 \times V_9 - 6.89$, if $V_9 < 0.41$.

4. The relationship between the contrast value in the first growth layer ($V_4$) and the standard deviation of the first growth layer ($V_{13}$) is:

$V_{13} > 0.3$, if $V_4 < 0.3$.

5. The relationship between the size growth ratio between the second and the third layers ($V_{20}$) and the central position shift between the second and the third layers ($V_{22}$) is:

$V_{22} < 0.16$, if $V_{20} > 0.4$.

6. The relationship between the shape factor in the first growth layer ($V_7$) and the central position shift between the first and the second growth layers ($V_{21}$) is:

$V_{21} > 0.86 - 1.22 \times V_7$

7. The relationship between the size growth ratio between the first and the second growth layers ($V_{19}$) and the central position shift between the first and second growth layers ($V_{21}$) is:

$V_{21} > 0.55 \times V^2_{19} - 0.42 \times V_{19} + 0.36$

8. The relationship between the shape factor in the third growth layer ($V_9$) and the longest axis in the third growth layer ($V_{12}$) is:

$V_9 > 0.5$, if $V_{12} < 0.25$.

9. The relationship between the shape factor in the second growth layer ($V_8$) and the central position shift between the second and the third growth layers ($V_{22}$) is:

$V_{22} < 0.12$, if $V_8 > 0.45$

10. The relationship between the contrast value in the second growth layer ($V_5$) and the standard deviation of digital values in the second growth layer ($V_{14}$) is:

$V_{14} > 0.32$, if $V_5 < 0.28$.

11. The relationship between the contrast value in the third growth layer ($V_6$) and the size growth ratio between the second and the third growth layers ($V_{20}$) is:

$V_{20} > 0.28$, if $V_6 < 0.2$.

12. The relationship between the shape factor in the second growth layer ($V_8$) and the shape factor in the third growth layer ($V_9$) is:

$V_9 > 2.5 \times V_8 - 0.15$

In the second test the topographic feature criteria was set up differently in three image difficulty groups. In each group, based on its topographic feature distribution, four boundary conditions were selected (see below). Thus, the total number of boundary conditions was kept the same. The experiment demonstrated a different result. Using this simple "adaptive" method, the CAD scheme could reduce more false-positives. The overall false-positive rate became 0.57 per image in this image subset. As shown in TABLE III, in the second test using the "adaptive" method, the CAD performance was improved in each image group. Then, using the testing image subset (two hundred and eighty nine (289) images with one hundred and forty five (145) verified masses) the performance of the non-adaptive and adaptive CAD were evaluated on this subset which was not used in the optimization phase. The same conclusion can be found and proved by using the testing image subset, as demonstrated in TABLE IV.

TABLE III

Comparison of CAD performance on training image database using adaptive and non-adaptive topographic feature criteria in classification of positive masses based on image difficulty indices.

| Number of Images | Group 1 | Group 2 | Group 3 | Total Images |
|---|---|---|---|---|
| Total images in each group | 34 | 83 | 63 | 180 |
| Total true-positive masses in each group | 14 | 47 | 29 | 90 |
| True-positive masses detected (sensitivity) | 13 (92.9%) | 46 (97.9%) | 28 (96.6%) | 87 (96.7%) |
| Total suspicious mass regions detected after image segmentation | 440 (13.21/ image) | 1590 (19.16/ image) | 1661 (26.37/ image) | 3700 (20.56/ image) |
| Total false-positives detected after three single-layer feature classification | 63 (1.85/ image) | 190 (2.29/ image) | 185 (2.94/ image) | 438 (2.43/ image) |
| Total false-positives detected by using non-adaptive topographic feature criteria | 19 (0.56/ image) | 72 (0.87/ image) | 17 (1.13/ image) | 162 (0.90/ image) |
| Total false positives detected by using adaptive topographic feature criteria | 16 (0.47/ image) | 14 (0.53/ image) | 42 (0.67/ image) | 102 (0.57/ image) |

TABLE IV

Comparison of CAD performance on testing image database using adaptive and non-adaptive topographic feature criteria in classification of positive masses based on image difficulty indices.

| Number of Images | Group 1 | Group 2 | Group 3 | Total Images |
|---|---|---|---|---|
| Total images in each group | 85 | 125 | 79 | 289 |
| Total true-positive masses in each group | 38 | 74 | 33 | 145 |
| True-positive masses detected (sensitivity) | 38 (100%) | 74 (100%) | 33 (100%) | 145 (100%) |
| Total suspicious mass regions detected after image segmentation | 1130 (13.29/ image) | 2309 (18.47/ image) | 1754 (22.20/ image) | 5193 (17.97/ image) |
| Total false-positives detected after three single-layer feature classification | 137 (1.61/ image) | 314 (2.51/ image) | 244 (3.09/ image) | 695 (2.41/ image) |
| Total false-positives detected by using non-adaptive topographic feature criteria | 42 (0.49/ image) | 122 (0.98/ image) | 105 (1.33/ image) | 265 (0.92/ image) |
| Total false positives detected by using adaptive topographic feature criteria | 35 (0.41/ image) | 75 (0.60/ image) | 60 (0.76/ image) | 170 (0.59/ image) |

The following summarizes the rules of adaptive topographic feature classification criteria used in the CAD scheme for each of the three groups based on the large database used in this experiment.

Rules For Group I (easy group):
If the relationship between two feature components satisfies one of following conditions, the feature vector will be considered as negative one and the suspicious region represented by this feature vector will be diagnosed as a negative region by the CAD scheme.

1. The relationship between the contrast value ($V_4$) in the first growth layer and the standard deviation of digital value ($V_{13}$) in the first growth layer is:

$$V_{13} > 0.84 \times V_4 + 0.04$$

2. The relationship between the size growth ratio between the second and the third layers ($V_{20}$) and the central position shift between the second and the third layers ($V_{22}$) is:

$$V_{20} > 0.425 \times V_{22} + 0.305$$

3. The relationship between the central position shift between the first growth layer and the second growth layer ($V_{23}$) and the central position shift between the second growth layer and the third growth layer ($V_{22}$) is:

$$V_{21} < 0.4, \text{ if } V_{22} > 0.1;$$

or $$V_{22} = 0, \text{ if } V_{21} > 0.1.$$

4. The relationship between the shape factor in the third growth layer ($V_9$) and the size growth ratio between the second and the third growth layers ($V_{20}$) is:

$$V_{20} < 0.22, \text{ if } V_9 > 0.3$$

Rules For Group II (medium difficulty group):
If the relationship between two feature components satisfies one of following conditions, the feature vector will be considered as negative one and the suspicious region represented by this feature vector will be diagnosed as a negative region by the CAD scheme.

1. The relationship between the central position shift between the first and the second growth layers ($V_{21}$) and the central position shift between the second and the third growth layers ($V_{22}$) is:

$$V_{21} < 0.05, \text{ if } V_{22} > 0.1;$$

or $$V_{22} > 0.25$$

2. The relationship between the shape factor in the third growth layers ($V_9$) and the central position shift between the second and the third growth layers ($V_{22}$) is:

$$V_9 > 0.31, \text{ if } V_{22} < 0.05;$$

or $$V_9 < 0.3, \text{ if } V_{22} > 0.1$$

3. The relationship between the shape factor of the second growth layer ($V_9$) is:

$$V_9 < 0.23, \text{ if } V_8 > 0.23.$$

4. The relationship between the shape factor of the first layer ($V_7$) and the size growth ratio between the first and the second growth layers ($V_{19}$) is:

$$V_7 > 0.29, \text{ if } V_{19} < 0.26.$$

Rules For Group III (difficult group):
If the relationship between two feature components satisfies one of following conditions, the feature vector will be considered as negative one and the suspicious region represented by this feature vector will be diagnosed as a negative region by the CAD scheme.

1. The relationship between the contrast value in the third growth layer ($V_6$) and the standard deviation of digital value in the third growth layer ($V_{15}$) is:

$$V_{15} > 0.345, \text{ if } V_6 < 0.35$$

2. The relationship between the shape factor in the second growth layer ($V_8$) and the central position shift between the first and the second growth layers ($V_{21}$) is:

$$V_8 > 0.44 - 0.6 \times V_{21}.$$

3. The relationship between the longest axis in the third growth layer ($V_{13}$) and the size growth ratio between the second and the third growth layers ($V_{20}$) is:

$$V_{12} < 2.25 \times V_{20} - 0.625.$$

4. The relationship between the skewness of the digital values in the third growth layer ($V_{18}$) and the size of the third growth layer ($V_3$) is:

$$V_{18} < -1.5, \text{ if } V_3 > 0.25.$$

Note that image difficulty as used herein means difficulty to perform computer-aided detection and does not mean the difficulty of visually detecting certain features. This is because human vision has a different adjusting capability for the variation of different image features. The image characteristics indices defined herein are specifically used as the first step in developing a sensitive and robust and adaptive CAD scheme. For this purpose, a method was developed to rate the image difficulty using a 1 to 10 ordinal rating scale based on global image features. The scoring depends on features in both space and frequency domains. In the space domain, the scoring is mainly based on the analysis of the digital value histogram of the image, because it is related to many of the image features and it is simple to compute. Based on observations of a large number of images, the difference distribution of histograms among images with different types of tissue background, such as fatty, fatty-glandular, and dense-glandular, is obvious. Any abnormalities in the fatty tissue background are much easier to detect with CAD schemes as compared with abnormalities in dense-glandular tissue background. Thus, in order to determine the image characteristics index automatically by CAD schemes many features related to the histogram distribution can be extracted. For example, mean, variance, skewness, kurtosis and entropy, in the first-order histogram of the digital values, and related to contrast and correlation between the pixels in the second-order histogram of the image can all be extracted. Many of these features have been shown to be useful in classifying different tissue structures in digital mammograms. (See Suckling J. et al. "Segmentation of mammograms using multiple linked self-organizing neural networks," *Med. Phys.* Vol. 22, pp. 145–152, 1995).

In the frequency domain, the fractal dimension is analyzed and feature components in Gaussian bandpass filtering are computed. The amount of higher frequency components in the frequency domain correlate with the number of suspicious microcalcification regions. These also correlate with the difficulty of a CAD scheme to reduce the false-positive microcalcification detection rate. In a similar manner, the more fluctuate patterns in the lower frequency distribution, the more false-positive masses are likely to be identified by the CAD scheme. In order to effectively extract such image difficulty information in the frequency domain, methods of bandpass filtering and fractal dimension are used. By using different kernel size of Gaussian filters, the general complexity of tissue structure in certain frequency ranges can be extracted. It should be noted that fractal dimension analysis can also be an effective method to quantitatively measure the complexity of tissue texture in radiographs under certain noise-free conditions. (See Chen J. et al., "Fractal analysis of trabecular patterns in projection radiographs: An assessment," *Invest. Radiol.*, Vol. 29, pp. 624–629, 1994.

Thus, a method for optimizing and adapting a computer-aided detection system is provided. One skilled in the art will appreciate that the present invention can be practiced by other than the described embodiments, which are presented for purposes of illustration and not limitation, and the present invention is limited only by the claims that follow.

What is claimed is:

1. A method of training a computer aided scheme for detecting regions of interest in images, the method comprising:
   (A) providing a database of images having known regions of interest;
   (B) for each image in the database,
      (b1) measuring global image features of the image in at least one of the space domain and the frequency domain, and
      (b2) establishing an image characteristic index for the image based on said measured global image features;
   (C) dividing all the images in the database into a plurality of image groups based on the image characteristic index of each image in the database;
   (D) training the computer aided scheme independently for each image group; and
   (E) establishing characteristics-based image classification criteria.

2. A method as in claim 1, wherein said images are radiographs and wherein said regions of interest are abnormal regions in living tissue depicted in said radiographs.

3. A method as in claim 2, wherein said computer aided detection scheme comprises:
   (a) digitizing the radiograph to produce a digitized radiograph;
   and, by computer,
   (b) identifying, according to predetermined criteria, any suspected abnormal regions; and
   (c) for each identified suspected abnormal region,
      (i) extracting multiple topographic layers of the region from the digitized radiograph; and
      (ii) evaluating the extracted multiple topographic layers of abnormal regions to determine whether the region is an abnormal region.

4. A method as in claim 2, wherein the radiograph is a mammogram, and wherein the abnormal regions are masses.

5. A method as in claim 2, wherein the radiograph is a mammogram, and wherein the abnormal regions are clustered microcalcifications.

6. A method as in claim 1, wherein said dividing of said images divides the images into three image groups.

7. A method as in claim 1, wherein said measuring image features for each image comprises:
   generating a space domain histogram of the image; and
   extracting features from said histogram.

8. A method as in claim 7, wherein each of said images is a radiograph depicting a breast and wherein said extracted features include at least one of:
   the ratio between the peak value in the histogram and the area of the breast;

the difference between the peak point value and the average value of the histogram;

the standard deviation of the histogram distribution;

the skewness of the histogram distribution; and the number of local maxima in the histogram.

9. A method as in claim 1, wherein in the frequency domain, said features include at least one of:

a ratio between the number of pixels after thresholding in the bandpass filtered images and the breast area, using a high frequency bandpass;

a ratio between the number of pixels after thresholding in the bandpass filtered images and the breast area, using a low frequency bandpass; and the fractal dimension measurement in the central portion of the breast area.

10. A method as in claim 1, wherein said image characteristic index is a normalized weighted sum of said image features.

11. A method as in claim 1 wherein the computer aided scheme is a rule-based scheme and wherein the training comprises establishing different rules for each image group.

12. A method as in claim 1 wherein the computer aided scheme is a rule-based scheme and wherein the detecting of regions using a detection scheme trained specifically for the assigned image group uses a detection scheme with rules established for the assigned image group.

13. A method of detecting regions of interest depicted in a digital image, the method comprising:

(a) training a computer aided scheme for detecting regions of interest depicted in images, said training comprising:

(i) providing a database of images having known regions of interest;

(ii) for each image in the database, (A) measuring global image features in at least one of the space domain and the frequency domain, and (B) establishing an image characteristic index based on said global image features;

(iii) dividing all the images in the database into a plurality of image groups based on the image characteristic index of each image in the database;

(iv) optimizing the computer aided scheme independently for each image group; and (v) establishing image characteristics based classification criteria, and then (b) processing the digitized image by:

(i) determining global image features of the digitized image in at least one of the space domain and the frequency domain;

(ii) assigning the digitized image an image characteristics rating based on the determined global image features;

(iii) assigning the image to an image group based on the image rating using the established image characteristics based classification criteria; and (iv) detecting regions of interest depicted in the image using the detection scheme optimized specifically for the assigned image group.

* * * * *